United States Patent [19]

Fischer

[11] Patent Number: 4,905,872
[45] Date of Patent: Mar. 6, 1990

[54] VESSEL FOR INJECTING BONDING AGENT

[75] Inventor: Artur Fischer, Tumlingen, Fed. Rep. of Germany

[73] Assignee: fischerwerke Artur Fischer GmbH & Co. KG, Tumlingen, Fed. Rep. of Germany

[21] Appl. No.: 300,057

[22] Filed: Jan. 23, 1989

[30] Foreign Application Priority Data

Jan. 21, 1988 [DE] Fed. Rep. of Germany ....... 3801668

[51] Int. Cl.$^4$ .............................................. B65D 83/00
[52] U.S. Cl. ................................... 222/145; 206/220; 222/319; 222/386; 222/563; 366/130
[58] Field of Search ................. 366/129, 130; 222/145, 222/149, 386, 319, 563, 322; 206/219, 220

[56] References Cited

U.S. PATENT DOCUMENTS

| | | |
|---|---|---|
| 3,140,078 | 7/1964 | Krahe et al. ................... 222/386 X |
| 3,217,946 | 11/1965 | Cook ............................... 222/386 |
| 3,595,439 | 7/1971 | Newby et al. .................. 222/386 X |
| 3,735,900 | 5/1973 | Gores ............................. 222/386 X |
| 3,885,710 | 5/1975 | Cohen . | |
| 3,972,512 | 8/1976 | Grisé et al. ................... 366/129 |
| 4,208,133 | 6/1980 | Korte-Jungermann ........... 366/130 |
| 4,609,129 | 9/1986 | Fischer .......................... 222/386 |
| 4,640,443 | 2/1987 | Corsette . | |
| 4,648,532 | 3/1987 | Green ........................... 222/386 X |
| 4,735,509 | 4/1988 | Rausch ........................ 366/129 X |

FOREIGN PATENT DOCUMENTS 3341283 5/1985 Fed. Rep. of Germany .
8513391 8/1985 Fed. Rep. of Germany .
2350888 9/1977 France .

Primary Examiner—Kevin P. Shaver
Attorney, Agent, or Firm—Michael J. Striker

[57] ABSTRACT

A vessel for injecting a bonding agent for anchoring a mounting element in a drilled hole comprises a housing for accommodating one component of a bonding agent and having a housing opening, an injection piston provided with an injection nozzle and displaceable in the housing, the injection piston being arranged to close off the opening of the housing, and a removable rod inserted into the injection nozzle and acting as a seal for the injection nozzle.

3 Claims, 1 Drawing Sheet

VESSEL FOR INJECTING BONDING AGENT

BACKGROUND OF THE INVENTION

The present invention relates to a vessel for injecting a bonding agent such as mortar, adhesive and the like, for anchoring a securing element in a drilled hole. More particularly, it relates to such a vessel which has a housing with one component for accommodating a bonding agent and an injection piston provided with an injection nozzle and displaceable in the housing.

Vessels of the above mentioned general type are known in the art. One of such vessels is disclosed in the German reference DE-OS 3,341,283. This reference discloses a vessel for injecting a bonding agent for anchoring a mounting element in a drilled hole, which has a housing and an injecting piston which is displaceable in the housing. Prior to the injection of a bonding agent, a sealing foil or the like is to be opened, and then the second component of the bonding agent can be added to the first component which is accommodated in the housing. The components are then mixed together using a stirring rod. The bonding agent can be then injected by displacement of the injection piston in the housing of the vessel. The conventional vessel of this type requires additional sealing means to prevent impairing the components of the bonding agent in the housing during the storage by moisture or other factors and therefore making them unusable. Moreover, the stirring rod or the like has to be provided separately for mixing the binding agent.

SUMMARY OF THE INVENTION

Accordingly, it is an object of the present invention to provide a vessel of the above mentioned general type which avoids the disadvantages of the prior art.

More particularly, it is an object of the present invention to provide a vessel for injecting a bonding agent, which does not require additional sealing elements and can easily include the required stirring rod.

In keeping with these objects and with others which will become apparent hereinafter, one feature of the present invention resides, briefly stated, in a vessel in which an injection piston closes an opening of a container, and a removable rod acting as an injection nozzle seal is inserted in the injection nozzle.

When the vessel is designed in accordance with the present invention, the injection piston closes the opening of the container above the first component accommodated in the housing of the container. The injection nozzle provided on the injection piston is sealed by a rod which is formed as an injection nozzle seal. After withdrawing from the injection nozzle, the rod can be used as a stirring rod. Thereby the injection piston together with the rod-shaped injection nozzle seal forms a seal for the opening of the container. Additional sealing elements are no longer necessary.

In accordance with another feature of the present invention, the rod is longer than the height of the container with the injection piston. Thereby it projects outwardly beyond the injection nozzle so that it can be securely grasped and withdrawn by hand.

In accordance with an especially advantageous feature of the present invention, the piston is provided with a cup-shaped depression which is opened in the direction of the injection nozzle. The capacity of the depression for the other component corresponds to the mixing ratio or to an aliquot part of the mixing ratio in relation to the amount of the first component contained in the housing of the vessel. The cup-shaped depression can thereby serve as a measuring cup for the second component. Depending on the bonding agent, it can be filled one or more times with the second component which can be then mixed in the requisite amount with the first component of the bonding agent.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
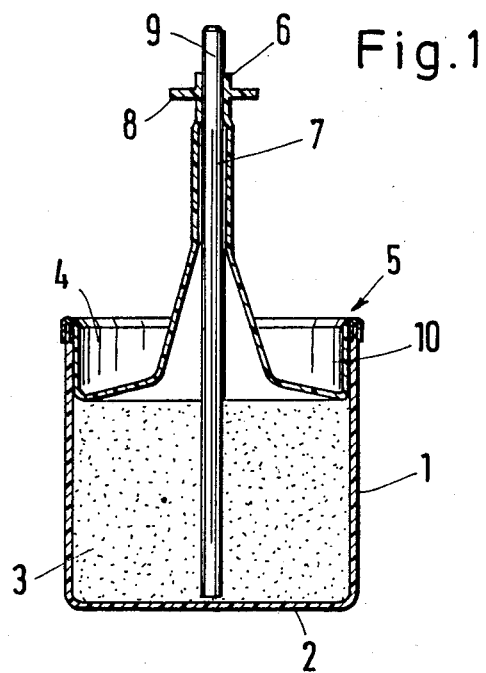
FIG. 1 is a view showing a housing of a vessel filled with one component of a bonding agent enclosed by means of an injection piston.
Figure 2:
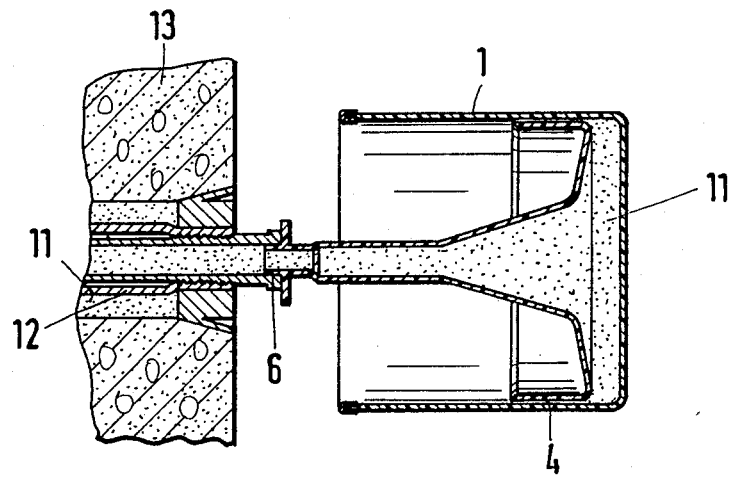
FIG. 2 is a view showing a mounting element inserted into a drilled hole in a masonry during the injection process with the utilization of the vessel in accordance with the present invention.

The vessel in accordance with the present invention has a housing which is identified with reference numeral 1 and preferably composed of a synthetic plastic material. The housing 1 is formed with a cup-shaped hollow cylinder with a bottom 2. A first component 3 of a bonding agent is accommodated in the above mentioned housing 1. This component is tightly sealed by an injection piston 4 which cooperates with an opening 5 of the container.

The injection piston 4 is provided with a projecting injection nozzle 6. The injection nozzle is tightly sealed by a rod 7 which is inserted in the injection nozzle. The rod 7 has a length which is greater than the height of the container with the inserted injection nozzle 6. Thereby the rod 7 cannot be pushed completely into the injection nozzle 6 inadvertently.

A flange 8 is provided on the injection nozzle 6. The flange serves as an abutment. The rod 7 has an end 9 which extends sufficiently far out of the injection nozzle 6 so as to be pulled out of the injection nozzle comfortably by hand.

The injection piston 4 has a cup-shaped depression 10. This depression serves as a measuring cup for mixing the bonding agent. The requisite amounts of the second component which is to be added to the first component 3, can be supplied into the depression 10. For this purpose the injection piston 4 is removed and the rod 7 is used as a stirring rod for mixing the bonding agent.

After the mixing of the bonding agent 11, it can be injected by pressing in the injection piston 4 from the injection nozzle 6 into a mounting element 12. After hardening of the bonding agent 11 which might be a bonding mortar, a very strong connection is produced between the element 12 and a wall 13 in which it is inserted.

As can be seen from FIG. 1, the rod 7 seals off the injection nozzle 6. At the same time it prevent the injection nozzle 6 from becoming sticky or blocked.

The vessel shown in FIG. 1 can be kept in a package for storing or sale. The inner height of the package corresponds to the height of the container with the projecting rod 7. The rod 7 is held securely in position as shown in FIG. 1.

The housing 1 of the vessel, the injection piston 4, and the rod 7 are cylindrical parts. Preferably they are composed of a synthetic plastic material.

It will be understood that each of the elements described above, or two or more together, may also find a useful application in other types of constructions differing from the types described above.

While the invention has been illustrated and described as embodied in a vessel for injecting a bonding agent, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A vessel for injecting a bonding agent for anchoring a mounting element in a drilled hole, comprising a housing for accommodating one component of a bonding agent and having a housing opening; an injection piston provided with an injection nozzle and displaceable in said housing, said injection piston having a side facing toward said injection nozzle and a cup-shaped depression which is open at said facing side of said injection piston and accommodates another component of the bonding agent, said injection piston being arranged to close off said opening of said housing and to be removed from said housing to provide for mixing of the one and another components of the bonding agent; and a rod formed as a stirring element and inserted into said injection nozzle to act as a seal for said injection nozzle and being removed from said injection nozzle for stirring the bonding agent in said housing after the one and the another components of the bonding agent have been mixed and with the injection piston removal from the housing.

2. A vessel as defined in claim 1, wherein said housing and said injection piston has a predetermined height, said rod having a length which is greater than said height of said housing and said injection piston.

3. A vessel as defined in claim 1, wherein said depression has a capacity which corresponds to a mixing ratio or to an aliquot part of the mixing ratio of the other component to the amount of the first mentioned component accommodated in the housing.

* * * * *